United States Patent [19]
Ellis et al.

[11] 3,917,608
[45] Nov. 4, 1975

[54] SUBSTITUTED 6,7 DIHYDRO-1-OXO N(1H-TETRAZOL-5-YL)-1H,5H-BENZO[IJ]QUINOLIZINE CARBOXAMIDES

[75] Inventors: Gwynn Pennant Ellis, Cardiff, Wales; Heulwen Moira Ridgway; David Edmund Bays, both of London, England

[73] Assignee: Allen & Hanburys Limited, London, England

[22] Filed: Mar. 27, 1974

[21] Appl. No.: 455,071

[30] Foreign Application Priority Data
Apr. 5, 1973  United Kingdom............ 16279/73

[52] U.S. Cl. .......... 260/287 P; 260/287 T; 424/258
[51] Int. Cl.² ....................................... C07D 215/16
[58] Field of Search ................................. 260/287 R

[56] References Cited
UNITED STATES PATENTS
3,728,350  4/1973  Beck................................. 260/287 P
3,793,328  2/1974  Hester.............................. 260/287 P Primary Examiner—Richard J. Gallagher
Assistant Examiner—David E. Wheeler
Attorney, Agent, or Firm—Bacon & Thomas

[57] ABSTRACT
Compounds of the general formula (I):

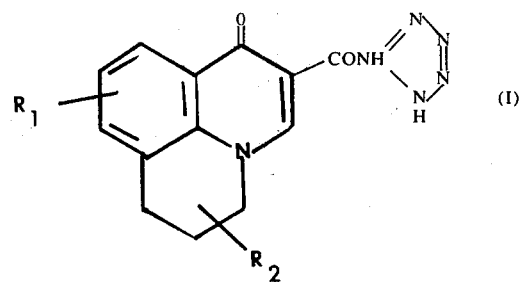

and pharmaceutically acceptable salts thereof in which: $R_1$ represents a hydrogen atom, an alkyl group, or the group $OR_3$ where $R_3$ is a hydrogen atom or an acyl group, or an alkenyl group or an alkyl group which alkyl group may optionally be substituted by amino, alkylamino, dialkylamino, alkylaralkylamino, aryl, aryloxy, acyloxy, alkoxy, hydroxy or tetrahydropyranyloxy groups; and up to 3 groups $R_1$, which may be the same or different, are present; and $R_2$ represents a hydrogen atom or an alkyl group. The compounds have utility for the treatment of conditions in which combination of an antigen with a reaginic anitbody is primarily responsible.

18 Claims, No Drawings

SUBSTITUTED 6,7 DIHYDRO-1-OXO N(1H-TETRAZOL-5-YL)-1H,5H-BENZO[IJ]-QUINOLIZINE CARBOXAMIDES

This invention relates to certain novel benzoquinolizines which have been found to have a useful profile of pharmocological activity. It also relates to a process for the production thereof, to pharmaceutical compositions containing them and to their use in therapy.

The invention provides compounds of the general formula (I) below and pharmaceutically acceptable salts thereof.

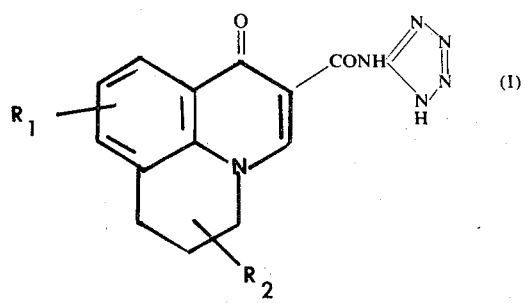

in which:

$R_1$ represents a hydrogen atom, an alkyl group, or the group $OR_3$ where $R_3$ is a hydrogen atom or an acyl group, or an alkenyl group or an alkyl group which alkyl group may optionally be substituted by amino, alkylamino, dialkylamino, alkylaralkylamino, aryl, aryloxy, acyloxy, alkoxy, hydroxy or tetrahydropyranyioxy groups; and up to 3 groups $R_1$, which may be the same or different, are present; and $R_2$ represents a hydrogen atom or an alkyl group.

The term "alkyl" when used above to define a single group or part of a group refers to a straight or branched chain alkyl group containing from 1 to 6 carbon atoms preferably 1 to 4 carbon atoms. The term "alkenyl" means a straight or branched chain alkenyl group containing from 3 to 6 carbon atoms and the term "aryl" preferably means phenyl. The term acyl when used above preferably means alkanoyl and includes the formyl and trifluoroacetoxy groups.

Our preferred classes of compounds are those in which the following groups have the meanings given below:

$R_1$ = hydrogen, alkyl particularly isopropyl, hydroxy, alkoxy particularly methoxy, ethoxy or isopropoxy, aryloxy particularly benzyloxy, alkenyloxy particularly allyloxy, alkoxyalkoxy, particularly 2-ethoxyethoxy, hydroxyalkoxy particularly 2-hydroxyethoxy, dialkylaminoalkoxy particularly 2-dimethylaminoethoxy, alkylaralkylaminoalkoxy particularly 2-methylbenzylaminoethoxy, acyloxy particularly trifluoroacetoxy, or tetrahydropyranyloxyalkoxy particularly 2-(tetrahydropyranyloxy)-ethoxy.

$R_2$ = hydrogen, alkyl particularly methyl.

Preferably there is one $R_1$ group present which is in the 9-position. Specific preferred compounds are those the preparation of which is described in the Examples.

The invention includes salts of compounds of formula I. Salts may be formed with inorganic bases, particularly those of alkali metals e.g. sodium or with organic bases such as dimethylaminoethanol. Where basic groups are present addition salts may also be formed with organic or inorganic acids e.g. hydrochloric acid.

The compounds of the invention show promise as agents for the treatment of conditions in which combination of an antigen with a reaginic antibody is primarly responsible, for example extrinsic asthma, hay fever, urticaria, eczema or atopic dermatitis. Thus 6-7-dihydro-1-oxo-N(1H-tetrazol-5-yl)-1H,5H-benzo(ij) quinolizine-2-carboxamide (Example 1) was compared with disodium cromoglycate, which is known to be effective in the prophylactic treatment of asthma. It was shown to be about 10 times as active as disodium cromoglycate in inhibiting release of histamine in the passive peritoneal anaphylaxis induced in rats with the DNP - egg albumen system (J. Exp. Med. 1969, 127, 727).

The invention also provides pharmaceutical compositions which contain a compound of general formula (I) or a salt thereof together with a pharmaceutically acceptable carrier, excipient, or other formulatory agent. The compositions may also contain supplementary medicinal agents, e.g. bronchodilators. Suitable forms of oral administration include tablets, capsules, syrups, or emulsions. For administration by inhalation the compositions according to the invention may be in the form of a powder or snuff or as an aerosol spray presentation. The latter may conveniently be a pressurised pack with a metering valve to deliver a fixed dosage unit or may be an aqueous solution delivered via a nebuliser.

The dosage at which the active ingredient is administered may vary within a wide range, depending on the age, weight and condition of the patient. A suitable oral dosage range is generally from 2–1500 mg and for inhalation is from 0.1–20 mg. The dose may be repeated as required.

The invention also provides a process for the preparation of compounds of formula I in which a benzo (ij) quinolizine-2-carboxylic acid (II) or an activated derivative thereof is condensed with 5-aminotetrazole (III).

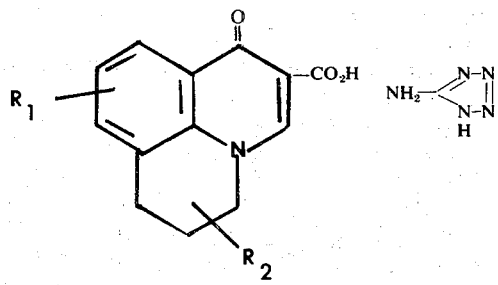

In the above formula (II) $R_1$ and $R_2$ have the meanings given above or are groups convertible thereto.

The condensation of an acid (II) with 5-aminotetrazole (III) may be effected with the aid of a variety of condensing agents which are of general application for the formation of amide bonds. One such reagent N,N'-carbonyldiimidazole, is particularly useful and condensations using this reagent are preferably carried out in an aprotic solvent such as a tetrahydrofuran and/or dimethylformamide. The reaction may be carried out at ambient or elevated temperatures e.g. 20°–120°C.

Suitable activated derivatives of the benzo(ij) quinolizinocarboxylic acids (II) include the acid halide, the intermediate ester (VI) with polyphosphoric acid, followed if necessary by hydrolysis of the benzo (ij) quinolizine-2-carboxylic acid ester (VII) with aqueous alkali.

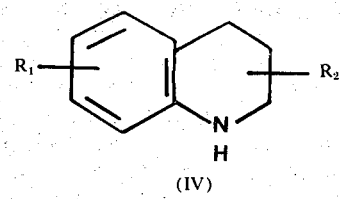

(IV)

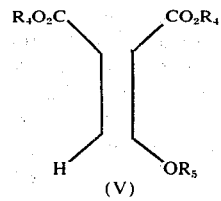

(V)

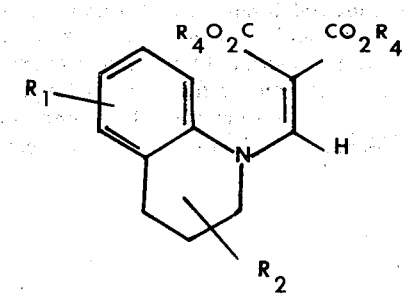

(VI)

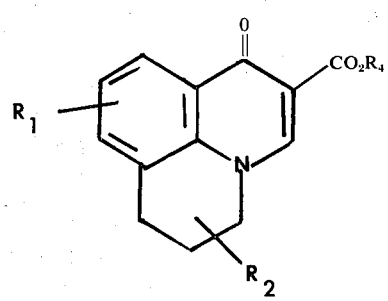

(VII)

preferably the acid chloride or a mixed anhydride preferably the mixed anhydride derived from an acid (II) and an alkylcarbonic acid e.g. ethylcarbonic acid $C_2H_5OCOOH$.

The condensation of an acid chloride derived from a benzo(ij)quinolizine-2-carboxylic acid (II) with 5-aminotetrazole is preferably carried out in an aprotic solvent such as dioxan or tetrahydrofuran, and is also preferably carried out in the presence of an acid acceptor, for example a tertiary organic base, such as pyridine, or triethylamine, or in an aqueous medium in the presence of an inorganic base such as an alkali metal hydroxide, carbonate or bicarbonate e.g. sodium or potassium hydroxide, sodium or potassium carbonate or bicarbonate.

When a mixed anhydride is used as activated derivative the reaction may also be carried out in a polar aprotic solvent such as dimethylformamide, at a reaction temperature which is preferably below 10°C.

Compounds according to the invention may also be converted into other compounds of the invention. Thus compounds in which $R_1$ is a benzyloxy group may be converted into compounds in which $R_1$ is a hydroxy group by hydrogenolysis, for example by reaction with hydrogen in the presence of a noble metal catalyst such as palladium. Compounds in which $R_1$ is a tetrahydropyranyloxyalkoxy group may be converted into compounds in which $R_1$ is a trifluoroacetoxyalkoxy group by treatment with trifluoroacetic acid. Compounds in which $R_1$ is a hydroxyalkoxy group may be prepared by hydrolysis, preferably alkaline hydrolysis, of the compounds of formula (I) where $R_1$ is a trifluoroacetoxyalkoxy group.

The starting benzo(ij)quinolizine-2-carboxylic acids (II) may be prepared from the tetrahydroquinoline (IV) by treatment with an alkyl alkoxymethylenemalonate (V), where $R_4$ and $R_5$ = alkyl, and cyclisation of The groups $R_1$ and $R_2$ may be present throughout the synthesis of the compounds of formula (II) or may be introduced or modified at any convenient stage in the synthesis. For example the benzo(ij)quinolizine-2-carboxylic acid (II; $R_1 = OR_3$) where $R_3$ has the meanings given other than hydrogen, may be converted into the corresponding acid (II, $R_1 = OH$) by heating with aqueous hydrogen bromide in glacial acetic acid. The hydroxy acid (II; $R_1 = OH$) may then be converted into other benzo(ij)quinolizine-2-carboxylic acids (II; $R_1 = OR_3$) by standard alkylation or acylation procedures. For example the acid (II; $R_1 = OR_3$) may be prepared by the reaction of the hydroxy acid (II; $R_1 = OH$) with conventional alkylating agents such as an alkyl halide or dialkyl sulphate. These reactions may be advantageously carried out in a solvent such as 2-butanone or dimethylformamide and in the presence of an alkali metal carbonate such as potassium carbonate; the reaction may be carried out at elevated temperatures if desired.

The following Examples illustrate the invention:

EXAMPLE 1

6,7-Dihydro-1-oxo-N(1H-tetrazol-5-yl)-1H,5H-benzo[ij]-quinolizine-2-carboxamide 6,7-Dihydro-1-oxo-1H,5H-benzo[ij]quinolizine-2-carboxylic acid (2 g) and N,N'-carbonyldiimidazole (1.4 g) in dimethylformamide (40 ml) were heated to 100° for 5½ hours. 5-Amino-1H-tetrazole (1.1 g) was added and the mixture was heated to 100° for 1 hour. The precipitate was collected and dissolved in a mixture of dimethylaminoethanol, water and dimethylformamide (1:1:1). The solution was filtered and acidified with dilute hydrochloric acid and the solid was collected and dried, m.p. above 318° (d), (60%).

EXAMPLE 2

6,7-Dihydro-9-methoxy-1-oxo-N(1H-tetrazol-5-yl)-1H,5H-benzo [ij]quinolizine-2carboxamide 6,7-Dihydro-9-methoxy-1-oxo-1H,5H-benzo[ij]quinolizine-2-carboxylic acid (0.8 g) and N,N'-carbonyldiimidazole (0.75 g) in tetrahydrofuran (15 ml) and dimethylformamide (15 ml) were heated under reflux for 6 hours. 5-Amino-1H-tetrazole (0.8 g) was added and the mixture was heated under reflux for 30 minutes. The solid was collected and dissolved in aqueous dimethylaminoethanol (10 ml, 5%) and the solution was filtered and acidified with glacial acetic acid. The solid was collected, washed with hot ethanol and dissolved in aqueous dimethylaminoethanol (10 ml, 5%). The solution was acidified with glacial acetic acid and the solid was filtered off, m.p. 321°–322° (d), (50%).

EXAMPLE 3

9-Ethoxy-6,7-dihydro-1-oxo-N(1H-tetrazol-5-yl)-1H,5H-benzo [ij]quinolizine-2-carboxamide a.
6,7-Dihydro-9-hydroxy-1-oxo-1H,5H-benzo[ij]quinolizine-2-carboxylic acid 6,7-Dihydro-9-methoxy-1-oxo-1H,5H-benzo[ij]quinolizine-2-carboxylic acid (200 mg), aqueous hydrobromic acid (2 ml, 48%) and glacial acetic acid (2 ml) were heated under reflux to 19 hours and allowed to cool. The solid was collected, m.p. 338° (d), (78%).

b. 1
9-Ethoxy-6,7-dihydro-1-oxo-1H,5H-benzo[ij]quinolizine-2-carboxylic acid 6,7-Dihydro-9-hydroxy-1-oxo-1H,5H-benzo[ij]-quinolizine-2-carboxylic acid (3.6 g), diethyl sulphate (5.8 ml) and anhydrous potassium carbonate (8.1 g) in dimethylformamide (180 ml) were stirred and heated to 100° for 15 hours. The solid was filtered off and the filtrate was evaporated. The residue (9 g), aqueous sodium hydroxide (50 ml, 2N) and ethanol (150 ml) were heated under reflux for 45 minutes. The mixture was cooled and acidified with dilute hydrochloric acid. The solid was collected, dried and crystallised from dimethylformamide, m.p. 233°–235°, (60%).

The following compounds were prepared in a similar manner from 6,7-dihydro-9-hydroxy-1-oxo-1H,5H-benzo[ij]quinolizine-2-carboxylic acid using the alkylating agent quoted in the brackets:

2. 6,7-dihydro-9-(2-hydroxyethoxy)-1-oxo-1H,5H-benzo [ij]quinolizine-2-carboxylic acid, m.p. (2-bromoethanol).

3. 9-(2Ethoxyethoxy)-6,7-dihydro-1oxo-1H,5H-benzo [ij]quinolizine-2-carboxylic acid, m.p. 177°–179°, (66%) (2-ethoxyethyl bromide).

4. 6,7-Dihydro-1-oxo-9-[2'-(2''-tetrahydropyranyloxy) ethoxy]-1H,5H-benzo[ij]quinolizine-2-carboxylic acid, m.p. 145.5°–146.5°, (84%) (2-(2'-tetrahydropyranyloxy)ethyl bromide).

5. 6,7-Dihydro-9-isoproproxy-1-oxo-1H,5H-benzo[ij]quinolizine-2-carboxylic acid, m.p. 230°–231°, (35%) (isopropyl bromide).

c.
9-Ethoxy-6,7-dihydro-1-oxo-N(1H-tetrazol-5-yl)-1H,5H-benzo[ij]quinolizine-2-carboxamide 9-Ethoxy-6,7-dihydro-b 1-oxo-1H, 5H-benzo[ij]quinolizine-2-carboxylic acid (200 mg) and N,N'-carbonyl-diimidazole (131 mg) in dimethylformamide (5 ml) were heated at 100° for 6 hours. 5-Amino-1H-tetrazole (75 mg) was added and the mixture was heated at 100° for 1 hour and cooled. The solid was collected and dissolved in warm (60°) aqueous potassium hydroxide (20 ml, 1N) and the solution was filtered and acidified with dilute hydrochloric acid. The solid was collected and dried, m.p. 314°–315.5° (d), (46%).

The following compounds were prepared in a similar manner (using 5-amino-1H-tetrazole and the indicated starting material):

9-(2-Ethoxyethoxy)-6,7-dihydro-1-oxo-N(1H-tetrazol-5-yl)-1H,5H-benzo[ij]quinolizine-2-carboxamide, m.p. 286°–288°, (43%) (9-(2-Ethoxyethoxy)-6,7-dihydro-1-oxo-1H,5H-benzo[ij]quinolizine-2-carboxylic acid).

6,7-Dihydro-1-oxo-9-[2'-(2''-tetrahydropyranyloxy) ethoxy]-N(1H-tetrazol-5-yl)-1H,5H-benzo[ij]quinolizine-2-carboxamide, m.p. 300° (d), (30%) (6,7-Dihydro-1-oxo-9-[2'-(2''-tetrahydropyranyloxy)ethoxy]-1H,5H-benzo[ij] quinolizine-2-carboxylic acid). 6,7-Dihydro-9-isopropoxy-1-oxo-N(1H-tetrazol-5-yl)-1H,5H-benzo[ij]quinolizine-2-carboxamide, m.p. >300°, (47%) (6,7-Dihydro-9-isopropoxy-1-oxo-1H,5H-benzo[ij]quinolizine-2-carboxylic acid).

EXAMPLE 4

9-Allyloxy-6,7dihydro-1-oxo-N(1H-tetrazol-5-yl)-1H,5H-benzo [ij]quinolizine-2-carboxamide a. 1.
9-Allyloxy-6,7-dihydro-1-oxo-1H,5H-benzo[ij]quinolizine-2-carboxylic acid, allyl ester 6,7-Dihydro-9-hydroxy-1-oxo-1H,5H-benzo[ij] quinolizine-2-carboxylic acid (2 g) (Example 3a), allyl bromide (4.95 g) and potassium carbonate (5.6 g) in dimethylformamide (100 ml) were heated at 100° for 36 hours. The mixture was filtered and the filtrate was evaporated and the residue was triturated with water to give a solid. This was collected and dried, m.p. 139°–140°, (90%).

The following compound was prepared in a similar manner from 6,7-dihydro-9-hydroxy-1-oxo-1H,5H-benzo[ij] quinolizine-2-carboxylic acid:

2. 9-Benzyloxy-6,7-dihydro-1-oxo-1h,5H-benzo[ij] quinolizine-H,-carboxylic acid, benzyl ester, m.p. 156°–158°, 100% (alkylating agent, benzyl bromide).

b. 1. 9-Allyloxy-6,7-dihydro-1-oxo-1H,5H-benzo[ij] quinolizine-2-carboxylic acid 9-Allyloxy-6,7-dihydro-1-oxo-1H,5H-benzo[ij] quinolizine-2-carboxylic acid, allyl ester (2.4 g), N sodium hydroxide (8.8 ml) and ethanol (8.9 ml) were heated on a steam bath for 0.5 hours. The ethanol was distilled off and 2N hydrochloric acid was added to the remaining aqueous solution. The solid was collected and dried. It had m.p. 205°–206.5°, (90%).

The following compound was prepared in a similar manner:

2. 9-Benzyloxy-6,7-dihydro-1-oxo-1H,5H-benzo [ij] quinolizine-2-carboxylic acid, m.p. 233°–235°, (81%), from the compound of (a)(2) above.

c. 1.

9-Allyloxy-6,7-dihydro-1-oxo-N(1H-tetrazol-5-yl)-1H,5H-benzo[ij]quinolizine-2-carboxamide 9-Allyloxy-6,7-dihydro-1-oxo-1H,5H-benzo[ij]quinolizine-2-carboxylic acid (1.2 g) and N,N'-carbonyldiimidazole (0.68 g) in dimethylformamide (25 ml) were stirred at 90° for 4 hours. 5-Amino-1H-tetrazole (0.36 g) was added and stirring and heating at 90° was continued for a further 2 hours. The solid was filtered off and dried. It had m.p. 297°–298°, (48%).

The following compound was prepared in a similar manner:

2. 9-Benzyloxy-6,7-dihydro-1-oxo-N(1H-tetrazol-5-yl)-1H,5H-benzo[ij]quinolizine-2-carboxamide, m.p. 302°–304° (d), (62%), from the compound of (b) (2) above.

EXAMPLE 5

6,7-Dihydro-9-(2-dimethylaminoethoxy)-1-oxo-N(1H-tetrazol-5-yl)-1H,5H-benzo[ij]quinolizine-2-carboxamide, hydrochloride a. 1.

6,7-Dihydro-9-(2-dimethylaminoethoxy)-1-oxo-1H,5H-benzo[ij]quinolizine-2-carboxylic acid, hydrochloride 6,7-Dihydro-9-hydroxy-1-oxo-1H,5H-benzo[ij]quinolizine-2-carboxylic acid (2 g), 2-diemthylaminoethyl chloride, hydrochloride (3.5 g) and potassium carbonate (5.6 g) in dimethylformamide (100 ml) were stirred and heated at 100° for 30 hours. The mixture was filtered and the filtrate was evaporated. The residue in N sodium hydroxide (10 ml) and ethanol (10 ml) was heated under reflux for 35 minutes and cooled. 2N Hydrochloric acid was added and the solid was collected and dried. It had m.p. 277°–279° (d), (40%).

2. 9-[2-(N-benzyl-N-methylamino)ethoxy]-6,7-dihydro-1-oxo-1H,5H-benzo[ij]quinolizine carboxylic acid, hydrochloride, monohydrate, m.p. > 240° (d), (34%), was prepared in a similar manner from N-benzyl-N-methylaminoethyl bromide and 6.7-dihydro-9-hydroxy-1-oxo-1H,5H-benzo[ij]quinolizine-2-carboxylic acid.

b. 1.

6,7-Dihydro-9-(2-dimethylaminoethoxy)-1-oxo-N(1H-tetrazol-5-yl)-1H,5H-benzo[ij]quinolizine-2-carboxamide, hydrochloride, dihydrate 6,7-Dihydro-9-(2-dimethylaminoethoxy)-1-oxo-1H,5H-benzo[ij]quinolizine-2-carboxylic acid, hydrochloride (1.1 g) and N,N'-carbonyldiimidazole (1 g) in dimethylformamide (55 ml) were stirred and heated at 100° for 4 hours. The solution was filtered and 5-amino-1H-tetrazole (1 g) was added to the filtrate and the mixture was stirred and heated at 100° for 1 hour. The solid that crystallised was collected and dissolved in 2N sodium hydroxide. 2N Hydrochloric acid was added to the solution and the solid was collected and was crystallised from glacial acetic acid and recrystallised from a mixture of dimethylformamide, isopropanol and water. It had m.p. 272°–274°, (15%).

2. 9-[2-N-Benzyl-N-methylamino)ethoxy]-6,7-dihydro-1-oxo-N(1H-tetrazol-5-yl)-1H,5H-benzo[ij]quinolizine-2-carboxamide, hydrochloride monohydrate, m.p. 239°–242° (d), (24%) was prepared in a similar manner from the corresponding acid described in Example 5(a)(2) above.

EXAMPLE 6

6,7-Dihydro-1-oxo-N(1H-tetrazol-5yl)-9-[2'-(trifluoroacetoxy)ethoxy]-1H,5H-benzo[ij]quinolizine-2-carboxamide 6,7-Dihydro-1-oxo-N(1H-tetrazol-5-yl)-9-[2'-(2''-tetrahydropyranyloxy)ethoxy]-1H,5H-benzo[ij]quinolizine-2-carboxamide (Example 3(c) (0.7 g), trifluoroacetic acid (50 ml) and water (5 ml) were stirred at room temperature for 3 hours. The mixture was evaporated and the residue was triturated with water to give a solid which was collected and dried, m.p. 300° (d), (84%).

EXAMPLE 7

6,7-Dihydro-9-(2-hydroxyethoxy)-1-oxo-N(1H-tetrazol-5yl)-1H,5H-benzo[ij]quinolizine-2-carboxamide 6,7-Dihydro-1-oxo-N(1H-tetrazol-5-yl)-9-[2'-(trifluoroacetoxy)ethoxy]-1H-5H-benzo[ij]quinolizine-2-carboxamide (0.4 g) in N sodium hydroxide (15 ml) was stirred at room temperature for 3 hours. The solution was filtered and the filtrate was acidified to give a solid that was crystallised from dimethylformamide, m.p. 295° (d), (64%).

EXAMPLE 8

9-Benzyloxy-6,7-dihydro-1-oxo-N(1H-tetrazol-5-yl)-1H,5H-benzo[ij]quinolizine-2-carboxamide, sodium salt 9-Benzyloxy-6,7-dihydro-1-oxo-N(1H-tetrazol-5-yl)-1H,5H-benzo[ij]quinolizine-2-carboxamide (Example 4(c) (2) (0.5 g) was dissolved in aqueous dimethylaminoethanol and 2N sodium carbonate was added. The solid that was precipitated was collected and dried. It had m.p. >300° (d).

EXAMPLE 9

6,7-Dihydro-5-methyl-1-oxo-N(1H-tetrazol-5-yl)-1H,5H-benzo[ij]quinolizine-2carboxamide 6,7-Dihydro-5-methyl-1-oxo-1H,5H-benzo[ij]quinolizine-2-carboxylic acid (4.5 g) and N,N'-carbonyldiimidazole (3 g) in dimethylformamide (50 ml) were stirred and heated to 90° for 3 hours. 5-Amino-1H-tetrazole (1.57 g) was added and the mixture was stirred and heated to 90° for a further 2 hours. The solid was collected and dried. It had m.p. 308° (d), (75%).

EXAMPLE 10

6,7-Dihydro-9-isopropyl-1-oxo-N(1H-tetrazol-5-yl)-1H,5H-benzo [ij]quinolizine-2-carboxamide a. 1,2,3,4-Tetrahydro-6-isopropylquinoline 6-Isopropylquinoline (12.4 g) and copper chromite catalyst (1.3 g) in ethanol (70 ml) were stirred in an atmosphere with hydrogen at 2000 p.s.i. pressure and a temperature of 160° for 2 hours. The catalyst was filtered off, the filtrate was evaporated and the residue was distilled under reduced pressure. The fraction that distilled at 102°–103°/0.45 mm was collected, 47%.

b.
[(1,2,3,4-Tetrahydro-6isopropylquinol-1-yl)methylene]-malonic acid, diethyl ester 1,2,3,4-Tetrahydro-6-isopropylquinoline (8.5 g) and diethyl ethoxymethylenemalonate (10.5 g) were stirred and heated to 120°–140° for 1 hour. The mixture crystallized on cooling and the solid was collected. It had m.p. 61°–64°, (100%).

c.
6,7-Dihydro-9-isopropyl-1-oxo-1H,5H-benzo[ij]-quinolizine-2-carboxylic acid, ethyl ester

[(1,2,3,4-Tetrahydro-6-isopropylquinol-1-yl) methylene]malonic acid, diethyl ester (15.1 g) was added to polyphosphoric acid (44 g) which was heated at 100° and maintained at this temperature for 1 hour. The mixture was cooled and added to water (250 ml) and the solution was neutralised with 5N sodium hydroxide, The solid was filtered off, dried and crystallised from a mixture of ethyl acetate and methanol. It had m.p. 235°–237°, (54%).

d.
6,7-Dihydro-9-isopropyl-1-oxo-1H,5H-benzo[ij]-quinolizine-2-carboxylic acid 6,7-Dihydro-9-isopropyl-1-oxo-1H,5H-benzo[ij]-quinolizine-2-carboxylic acid, ethyl ester (6 g) in N sodium hydroxide (22 ml) and ethanol (22 ml) was heated under reflux for 1 hour. The ethanol was distilled off and the residual solution was acidified to pH 1 with hydrochloric acid. The solid that separated was filtered off and was washed with water and dried and crystallised from dimethylformamide. It had m.p. 267°–269.5° (92%).

e.
6,7-Dihydro-9-isopropyl-1-oxo-N(1H-tetrazol-5-yl)-1H,5H-benzo[ij]-quinolizine-2-carboxamide 6,7-Dihydro-9-isopropyl-1-oxo-1H,5H-benzo[ij]quinolizine-2-carboxylic acid (3.3 g) and N,N'-carbonyldiimidazole (2.1 g) in dimethylformamide (50 ml) were stirred and heated to 100° for 3 hours. 5-Amino-1H-tetrazole (1.15 g) was added and the mixture was stirred and heated at 100° for 3 hours and the solid that separated was collected and crystallised from dimethylsulphoxide. It had m.p. 300° (d), (24%).

EXAMPLE 11

6,7-Dihydro-9-hydroxy-1-oxo-N(1H-tetrazol-5-yl)-1H,5H-benzo-[ij]quinolizine-2-carboxamide 9-Benzyloxy-6,7-dihydro-1-oxo-N(1H-tetrazol-5-yl)-1H,5H-benzo[ij]quinolizine-2-carboxamide (1 g) (Example 4(c)(2) and palladium on charcoal catalyst (0.1 g; 10%) in trifluoroacetic acid (25 ml) were shaken in an atmosphere of hydrogen at room temperature and pressure until the uptake of hydrogen ceased. The catalyst was filtered off and the filtrate evaporated. The residue was dissolved in aqueous dimethylaminoethanol (20 ml; 5%) the solution filtered and the filtrate acidified with dilute hydrochloric acid. The solid which separated was collected and dried. It had m.p. >330° (d).

EXAMPLE 12 (pharmaceutical compositions)

Inhalation aerosol

To prepare 100 aerosol cans, each of which delivers 200 metered doses of 1.0 mg AH 11215+

Micronise the AH 11215 sodium salt to give a powder in which nearly all the particles are smaller than 5μm in diameter. Dissolve 0.60 g of Emulsifier YN 100** in 570 g of trichlorofluoromethane (Arcton 11) at 10°C. Disperse in this solution with a high shear mixer 28.3 g of micronised AH 11215 sodium salt. Meter 5.7 g fractions of the drug suspension into suitable aluminum cans and seals the cans by crimping on suitable pressure-filling aerosol valves capable of metering 85 mg doses of final product. Inject through the valve into each can 14.7 g of dichlorodifluoromethane (Arcton 12). Fit a suitable oral adaptor/actuator unit on to each can.

**Emulsifier YN 100 is a grade of the ammonium salt synthetic lecithin, supplied by Cadbury Bros.

+AH11215 is the product of Example 1 and is used in the form of its sodium salt.

Tablets

To prepare 10,000 each containing 200 mg AH 11215

Mix together 2.160 kg of AH 11215 sodium salt (sieved 60 mesh) with 2.00 kg lactose B.P. and 100 g of maize starch. Evenly moisten the mixed powders with sufficient water to produce a cohesive mass, pass this through a 16 mesh sieve and dry the granules at 50°C in a fluidised bed dryer. Blend the dry granules with 100 g of maize starch and 10 g magnesium stearate. Compress on a suitable tablet press to give tablets each weighing 440 mg.

Capsules (for oral use)

To prepare 10,000 hard gelatin capsules containing AH 11215

Mix the powdered AH 11215 sodium salt (sieved 60 mesh) with sufficient Sta-Rx starch* 1500 and magnesium stearate equivalent to 1% of the total powder-weight, to give the required dosage, which can be up to 250 mg AH 11215. Fill into No. 1 hard gelatin capsules with a suitable capsulating machine.

*Sta-Rx starch 1500 is a grade of free-flowing starch supplied by A. E. Staley Co. Ltd., London.

Capsules for Inhalation

To prepare 10,000 capsules each containing 20 mg AH 11215, for use in an insufflator for inhalation into the lung.

Micronise the AH 11215 sodium salt to give a powder in which nearly all particles are smaller than 5μm diameter. Blend 216 g of micronised drug with 200 g of lactose B.P., previously sieved through 200 mesh and over 300 mesh sieves. Fill the powder blend into No. 3 hard gelatin capsules on a suitable machine, so that each capsule contains 41.6 mg of powder.

AH 11215 may be replaced by another compound according to the invention if desired.

The sodium salt of AH 11215 may be made from the parent carboxamide prepared according to Example 1 by utilizing sodium carbonate as described generally in Example 8.

We claim:
1. Compounds of the formula (I):

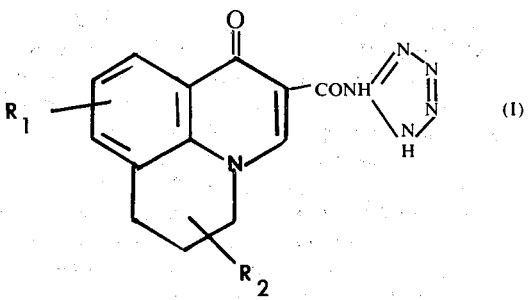

and pharmaceutically acceptable salts thereof in which: $R_1$ represents a hydrogen atom, an alkyl group, or the group $OR_3$, where $R_3$ is a hydrogen atom or an alkanoyl group, or an alkenyl group or an alkyl group which alkyl group may be substituted by alkylamino, dialkylamino, alkylbenzylamino, phenyl, benzyl, benzyloxy, alkanoyloxy, alkoxy, hyrdroxy, or tetrahydropyranyloxy groups; and up to 3 groups $R_1$; which may be the same or different are present; and $R_2$ represents hydrogen or an alkyl group, wherein alkyl when used above to define a single group or part of a group refers to a straight or branched chain alkyl group containing from 1 to 6 carbon atoms and the term alkenyl as defined above refers to a straight or branched chain alkenyl group containing from 3 to 6 carbon atoms and the term alkanoyl includes the formyl and the trifluoroacetoxy groups.

2. Compounds as claimed in claim 1 in which $R_1$ is selected from the group consisting of hydrogen, isopropyl, hydroxy, methoxy, ethoxy, isopropoxy, benzyloxy, allyloxy, 2-ethoxyethoxy, 2-hydroxyethoxy, 2-dimethylaminoethoxy, 2-methylbenzylaminoethoxy, trifluoroacetoxy, and 2-(tetrahydropyranyloxy)-ethoxy; $R_2$ is hydrogen or methyl.

3. Compounds as claimed in claim 1 in which $R_2$ represents hydrogen or alkyl.

4. A compound as claimed in claim 1 which is 6,7-dihydro-1-oxo-N(1H-tetrazol-5-yl)-1H,5H-benzo[ij]quinolizine-2-carboxamide.

5. A compound as claimed in claim 1 which is 6,7-dihydro-9-methoxy-1-oxo-N(1H-tetrazol-5yl)-1H,5H-benzo[ij]quinolizine-2-carboxamide.

6. A compound as claimed in claim 1 which is 9-ethoxy-6,7-dihydro-1-oxo-N(1H-tetrazol-5-yl)-1H,5H-benzo[ij]quinolizine-2-carboxamide.

7. A compound as claimed in claim 1 which is 9-(2-ethoxyethoxy)-6,7-dihydro-1-oxo-N(1H-tetrazol-5-yl)-1H,5H-benzo[ij]quinolizine-2-carboxamide.

8. A compound as claimed in claim 1 which is 6,7-dihydro-1-oxo-9-[2'-(2''-tetrahydropyranyloxy)ethoxy]N(1H-tetrazol-5-yl)-1H,5H-benzo[ij]quinolizine-2-carboxamide.

9. A compound as claimed in claim 1 which is 6,7-dihydro-9-isopropoxy-1-oxo-N(1H-tetrazol-5-yl)-1H,5H-benzo[ij]quinolizine-2-carboxamide.

10. A compound in claim 1 which is 9-allyloxy-6,7-dihydro-1-oxo-N(1H-tetrazol-5-yl)-1H,5H-benzo[ij]-quinolizine-2-carboxamide.

11. A compound as claimed in claim 1 which is 9-benzyloxy-6,7-dihydro-1-oxo-N(1H-tetrazol-5-yl)-1H,5H-benzo[ij]quinolizine-2-carboxamide.

12. A compound as claimed in claim 1 which is 9-[2-(N-benzyl-N-methylamino)ethoxy]-6,7-dihydro-1-oxo-N(1H-tetrazol-5-yl)-1H,5H-benzo[ij]quinolizine-2-carboxamide, hydrochloride, monohydrate.

13. A compound as claimed in claim 1 which is 6,7-dihydro-1-oxo-N(1H-tetrazol-5-yl)-9-[2'-(trifluoroacetoxy)ethoxy]-1H,5H-benzo[ij]quinolizine-2-carboxamide.

14. A compound as claimed in claim 1 which is 6,7-dihydro-9-(2-hydroxyethoxy)-1-oxo-N(1H-tetrazol-5-yl)-1H,5H-benzo[ij]quinolizine-2-carboxamide.

15. A compound as claimed in claim 1 which is 9-benzyloxy-6,7-dihydro-1-oxo-N(1H-tetrazol-5-yl)-1H,5H-benzo[ij]quinolizine-2-carboxamide, sodium salt.

16. A compound as claimed in claim 1 which is 6,7-dihydro-5-methyl-1-oxo-N(1H-tetrazol-5-yl)-1H,5H-benzo[ij]quinolizine-2-carboxamide.

17. A compound as claimed in claim 1 which is 6,7-dihydro-9-isopropyl-1-oxo-N(1H-tetrazol-5-yl)-1H,5H-benzo[ij]quinolizine-2-carboxamide.

18. A compound as claimed in claim 1 which is 6,7-dihydro-9-hydroxy-1-oxo-N(1H-tetrazol-5-yl)-1H,5H-benzo[ij]quinolizine-2-carboxamide.

* * * * *